United States Patent [19]
Bhat et al.

[11] Patent Number: 5,796,902
[45] Date of Patent: Aug. 18, 1998

[54] COHERENT BLUE/GREEN OPTICAL SOURCE AND OTHER STRUCTURES UTILIZING NON-LINEAR OPTICAL WAVEGUIDE WITH QUASI-PHASE-MATCHING GRATING

[75] Inventors: Rajaram Bhat, Middletown; Catherine Caneau, Red Bank; Mark A. Koza, Colonia; Sung Joo Yoo, Long Branch, all of N.J.

[73] Assignee: Bell Communications Research, Inc., Morristown, N.J.

[21] Appl. No.: 682,863

[22] Filed: Jul. 5, 1996

Related U.S. Application Data

[63] Continuation-in-part of Ser. No. 602,391, Feb. 16, 1996.
[51] Int. Cl.⁶ .................................................. G02B 6/00
[52] U.S. Cl. ........................ 385/122; 359/326; 372/22
[58] Field of Search .................. 385/14, 122; 372/22, 372/44, 45, 50; 359/326, 328, 329, 332

[56] References Cited

U.S. PATENT DOCUMENTS

| | | | |
|---|---|---|---|
| 5,207,864 | 5/1993 | Bhat et al. | 156/633 |
| 5,359,617 | 10/1994 | Kano et al. | 372/45 |
| 5,434,700 | 7/1995 | Yoo | 359/332 |

OTHER PUBLICATIONS

Yoo et al., "Quasi–Phasematched Second Harmonic Generation in AlGaAs Waveguides Prepared by Wafer–Bonding," *Nonlinear Guided Waves and Their Applications, 1995 Technical Digest Series, Optical Society of America*, Dana Point, CA, vol. 6, Feb. 23–25, 1995, pp. PD5–2–PD5–4.

Yoo et al., "Wavelength conversion by quasi–phase–matched difference frequency generation in AlGaAs waveguides," *OFC '95, Optical Fiber Communication: Postdeadline Papers*, Feb. 26–Mar. 3, 1995, San Diego, pp. PD14–2–PD14–5.

Yoo et al., "Transparent wavelength conversion by difference frequency generation in AlGaAs waveguides," *Technical Digest, OFC '96, Optical Fiber Communications*, San Jose, California, paper #WG–7, 1996, pp. 129–131.

Yoo et al., "Wavelength conversion by difference frequency generation in AlGaAs waveguides with peiodic domain inversion achieved by wafer bonding," *Applied Physics Letters*, vol. 68, May, 1996, pp. 2609–2611.

Alexander et al., "A Precompetitive Consortium on Wide–Band All–Optical Networks," *Journal of Lightwave Technology*, vol. 11, 1993, pp. 714–735.

Angell et al., "Growth of alternating <100>/<111>–oriented II–VI regions for quasi–phase–matched nonlinear optical devices on GaAs substrates," *Applied Physics Letters*, vol. 64, 1994, pp. 3107–3109.

(List continued on next page.)

*Primary Examiner*—Akm E. Ullah
*Attorney, Agent, or Firm*—Joseph Giordano; David A. Hey; Loria B. Yeadon

[57] ABSTRACT

A waveguide having alternating regions of different crystallographic orientations, thereby providing quasi-phase-matching for a non-linear frequency conversion, in which two wafers with or without epitaxial layers thereon are bonded together having different, preferably opposed, crystallographic orientations. One wafer is etched away, and a grating is etched such that one part of the grating has the orientation of one wafer and the other part has the orientation of the other wafer. Thereafter, a waveguide structure is epitaxially deposited upon the differentially oriented template so that the waveguide is differentially oriented in its axial direction. Thereby, quasi-phase-matching non-linear axial effects can be achieved. Several important devices can thereby be achieved, including a coherent optical source using frequency doubling and a frequency converter useful in wavelength division multiplexed communication, as well as others.

11 Claims, 12 Drawing Sheets

OTHER PUBLICATIONS

Brackett et al., "A scalable multiwavelength multihop optical network: a proposal for research on all-optical networks," *Journal of Lightwave Technology*, vol. 11, 1993, pp. 736–753.

Bortz et al., "Increased acceptance bandwidth for quasi-phasematched second harmonic generation in LiNbO$_3$ waveguides," *Electronic Letters*, vol. 30, 1994, pp. 34, 35.

Bourret-Coucheana, "On the origin of stacking faults at the GaAs/ZnSe heterointerface," *Applied Physics Letters*, vol. 68, 1996, pp. 1675 et seq.

Gunshor et al., "Blue-Laser CD Technology", *Scientific American*, vol. 275, Jul. 1996, pp. 48–51.

Lo et al., "Bonding by atomic rearrangment of InP/InGaAsP 1.5 μm wavelength lasers on GaAs substrates," *Applied Physics Letters*, vol. 58, 1991, pp. 1961–1963.

Ruvimov et al. "Nucleation and evolution of misfit dislocations in ZnSe/GaAs (001) heterostructures grown by low-pressure organometallic vapor phase epitaxy," *Applied Physics Letters*, vol. 68, vol. 68, 1996, p. 346 et seq.

Soldano et al., "Optical Multi-Mode Interference Devices Based on Self-Imaging: Principles and Application," *Journal of Lightwave Technology*, vol. 23, 1995, pp. 615–627.

Yoo et al., "Quasi-phase-matched second-harmonic generation in AlGaAs waveguides with periodic domain inversion achieved by wafer-bonding," *Applied Physics Letters*, vol. 66, Jun., 1995, pp. 3410–3412.

COHERENT BLUE/GREEN OPTICAL SOURCE AND OTHER STRUCTURES UTILIZING NON-LINEAR OPTICAL WAVEGUIDE WITH QUASI-PHASE-MATCHING GRATING

RELATED APPLICATION

This application is a continuation in part of Ser. No. 08/602,391, filed Feb. 16, 1996 now allowed.

GOVERNMENT INTEREST

The invention was made partially with government finding under contract MDA-972-95-3-0027 from the Advanced Research Projects Agency.

FIELD OF THE INVENTION

The invention generally relates to semiconductor optical devices. In particular, the invention relates to non-linear optical frequency converters, especially frequency doublers and difference frequency generators.

BACKGROUND OF THE INVENTION

The invention has been developed to address two technically related but commercially different needs. One involves frequency converters usable in the infrared portion of the optical spectrum; the other involves lasers and other optical sources producing short-wavelength radiation, particularly in the blue and green portions of the spectrum. However, it must be understood that the invention is applicable to a wide range of devices, including parametric amplifiers and oscillators. The background of infrared frequency converters will be introduced first; then, the optical sources will be shortly thereafter introduced.

The public telephone network is being increasingly implemented on a backbone of optical fibers. Although the fiber optic network was originally conceived as replacing electrical cables on a point-to-point basis with optical/electrical converters at the ends of each link, much recent research and development has centered on an all-optical network. In particular, as described by Brackett et al. in "A scalable multiwavelength multihop optical network: a proposal for research on all-optical networks," *Journal of Lightwave Technology*, vol. 11, 1993, pp. 736–753, an optical fiber can convey multiple data signals on respective optical carriers of different optical wavelengths. A similar system is described by Alexander et al. in "A Precompetitive Consortium on Wide-Band All-Optical Networks," *Journal of Lightwave Technology*, vol. 11, 1993, pp. 714–735. At switching nodes in the networks, the wavelength channels can be switched in different directions according to their wavelength. Thereby, electro-optical conversion need be performed only at the terminals of the network.

However, such all-optical networks as described above are limited to a number of terminals generally equal to the number of wavelength channels on the networks. The number of channels is presently limited to about twenty because of the need for optical fiber amplifiers of relatively small bandwidth and because of frequency variations between end terminals. To further expand the communication network, the optical frequencies must be reused. As described by Yoo in U.S. Pat. No. 5,434,700 and by Antoniades et al. in U.S. patent application, Ser. No. 08/568,037, filed Dec. 6, 1995, a straightforward frequency reuse involves multiple optical networks or network portions linked by frequency converters that can change the frequency of an optical carrier without the need to convert its conveyed data to electrical form.

Sources of coherent blue-green radiation have been an object of technological development for many years. By blue-green is meant lasers emitting in the shorter-wavelength, higher-frequency part of the optical spectrum and includes both blue and green and the portions of the spectrum in between. For reference, pure blue is considered to have a wavelength of 445 nm, pure green of 535 nm, and pure red of 665 nm. Blue-green, yellow, and red lasers are all available today. Argon-ion lasers emit at lines in the ultraviolet, violet, blue, and green. HeNe lasers emit in the green, yellow, and red. As discussed by Gunshor et al. in "Blue-Laser CD Technology," *Scientific American*, vol. 275, July 1996, pp. 48–51, progress has recently been made utilizing ZnCdSe semiconductors in a quantum-well structure, particularly for use in optical recording. However, to date, the reliability of ZnCdSe lasers has been unacceptably low at about 1 hour although recently a 100-hour lifetime has been reported. Semiconductor lasers emit in have also been developed based on GaN. These lasers ultraviolet, violet, and blue, but they have so far failed to operate CW at room temperature, and their reliability for CW operation is not known. Both types of lasers show extremely high threshold voltages, ~6 V for ZnSe and ~10 V for GaN, because of the problem of obtaining p-type contacts. Also, their threshold currents are very high, ~200 mA for ZnSe and ~600 mA for GaN.

It is well known that coherent blue-green sources can be achieved with a laser emitting at half of the frequency of the desired emission, and then passing this laser radiation through a non-linear material such as $LiNbO_3$, $LiTaO_3$, KTP, $KNbO_3$, etc., which generates second harmonic radiation. Such frequency doublers have been demonstrated with practical output powers in the range of 1 to 10 mW. However, they require external pump sources and cannot be integrated as are ZnSe and GaN. As a result, they are currently very expensive and are not attractive for optical recording or applications such as high-definition television.

Yoo's U.S. Pat. No. 5,434,700, incorporated herein by reference, describes quasi-phase-matching in a semiconductor waveguide. A basic problem with all-optical frequency conversion and frequency doubling is that the non-linear optical coefficients are quite small, thus requiring a long interaction length between an input signal wave and a high-intensity pump signal wave to produce an output signal of a different frequency. However, the pump and the data waves involved in the conversion have significantly different frequencies and, because of the usual dispersion in a non-linear material, experience different effective dielectric constants. As a result, the pump, input, and output signals fall out of phase over a length called the coherence length $l_C$. While in one coherence length the power in the pump wave is being converted from the pump signal to the input and output signals, in the following coherence length the power is being converted in the opposite direction. As a result, the effective conversion length is limited to one coherence length, which is not enough because of the low non-linear conversion efficiency. This problem occurs in many applications of non-linear optical conversions, some of which are described below.

Quasi-phase-matching circumvents this problem by modulating the non-linearity. As illustrated in the perspective view of FIG. 1, a semiconductor waveguide 10 is formed on a semiconductor substrate 12 to receive from an input fiber 14 an input data signal on an optical carrier at a wavelength $\lambda_1$ and an intense pump signal at a wavelength $\lambda_p$ and to transmit to an output fiber 16 an output data signal on an optical carrier at a wavelength $\lambda_2$. The semiconductor waveguide 10 includes alternating regions 18, 20 having different non-linear coefficients. Preferably each of the regions 18, 20 has a length equal to the coherence length $l_C$ although the fundamental requirement is that the nominal period of the alternating regions 18, 20 equals $2 \cdot l_C$. The condition of equal lengths will be assumed in the following discussion since it provides more efficient conversion.

Non-linear optical conversion requires that the non-linear material possess a non-centrosymmetric structure. In other words, a crystalline structure with inversion symmetry will not exhibit optical non-linearity. Lithium niobate and zinc-blende-structure semiconductors are examples of non-centrosymmetric materials, whereas silicon is an example of a centrosymmetric material with a diamond crystal structure that yields no optical non-linearity. Efficient non-linear conversion must employ non-linear materials in a way that phase matching can occur. Quasi-phase-matching utilizes modulation of the non-linearity at each coherence length so as to compensate the phase mismatch between interacting waves. This modulation of the non-linearity can be achieved by changing the crystal orientation. Lithium niobate, a popular material for non-linear effects, can be electrically poled in alternating stripes into two anti-parallel polarization states. In zinc-blende semiconductors, such poling is not easy, and other methods such as the one disclosed here must be utilized. In particular, a crystal with a |0,0,1| orientation and another crystal with a |0,0,–1| orientation, where the two crystals possess a common |1,1,0| axis, manifest optical non-linearities equal in magnitude but opposite in sign. The non-linear semiconductor waveguide of the Yoo patent is composed of a III-V semiconductor, such as AlAs, having a zinc-blende crystal structure in which a [0,0,1] orientation can be distinguished from a |0,0,–1| orientation because the Al and the As occupy non-equivalent sites. The related tetrahedral structure for silicon places silicon at both of these sites so that silicon possesses a centrosymmetric structure resulting in no non-linearity and thus cannot be used for non-linear optical conversion.

The preferred crystallographic structure for a non-linear waveguide is illustrated in cross section in FIG. 2 and includes alternating regions 30, 32 each of length equal to the coherence length $l_C$ and having an alternating structural anisotropy, indicated by the arrows pointing in opposite directions. The alternating anisotropy can be obtained if the first regions 30 have a [0,0,1] zinc-blende crystalline orientation and the second regions 32 have a [0,0,–1] orientation. As will be discussed below, the crystallographic orientations of the two regions 30, 32 may be offset slightly from the indicated values because of fabricational inaccuracies. The two sets of regions 30, 32 can have the same composition, e.g., AlAs.

The non-linear interaction discussed here relies on the second order susceptibility tensor $\chi_{ijk}^{(2)}$, and the non-linear generation is given by relations of the form $$E_i^{\omega_2} = \chi_{ijk}^{(2)} E_j^{\omega_1} E_k^{\omega_p} \qquad (1)$$

In the case of the zinc-blende structure and with a few further simplifications, the non-linear susceptibilities of the two regions 30, 32 are given respectively by $\chi$ and $-\chi$. That is, the sign of the non-linear susceptibility reverses between the two regions 30, 32. However, in this design the reversal of sign occurs with the same period over which the interacting waves (pump, input signal, and output signal) experience reversal of their relative phase because of dispersion. Hence, in the alternating structure the non-linear power flow is always from the pump wave $\omega_p$ to the input and output signals $\omega_1, \omega_2$. This well known effect is called quasi phase matching although the effect is somewhat more complex than indicated by the above simple derivation.

Achieving the alternating crystallographic alignment of FIG. 2 is a difficult task. The high optical quality required of the semiconductor waveguide usually means that it is grown epitaxially upon a mono-crystalline substrate, as is well known in the art. However, in almost all forms of epitaxial growth, the orientation of the grown material is precisely aligned with that of the substrate. Angell et al. have suggested epitaxially forming one type of quasi-phase-matched waveguide in "Growth of alternating <100>/<111>-oriented II-VI regions for quasi-phase-matched nonlinear optical devices on GaAs substrates," *Applied Physics Letters*, vol. 64, 1994, pp. 3107–3109. This structure, however, does not have the alternating inverted structure but instead regions of |1,0,0| orientation and regions of |1,1,1| orientation. This article did not report on the final waveguide, and the utility of this approach is uncertain. Further, this structure depends on the peculiar tendency of CdTe to form with a |1,1,1| orientation when grown on |1,0,0|-oriented GaAs, and the technique is thus limited to particular material combinations.

SUMMARY OF THE INVENTION

The invention can be summarized as both structures and methods of achieving the structure including a quasi-phase-matched waveguide or other integrated circuit structure having alternating crystallographic domains involving bonding together two wafers having differing non-linear susceptibilities or differing crystallographic orientations, etching away one of the wafers, and patterning a grating structure composed partially from one wafer and partially from the other wafer, and regrowing at least part of a waveguide structure over the grating structure having the alternating crystallography of the underlying material. Important devices can thereby be achieved such as frequency converters for communication systems and sources of coherent light in regions of the spectrum not previously attainable with simple, integrated devices.

DETAILED DESCRIPTION OF THE PREFERRED EMBODIMENTS

We have found that a waveguide of a compound semiconductor such as AlGaAs or ZnCdSe as well as other non-semiconductor materials and having periodic inversion of domains can be formed by combining wafer bonding, etching, and regrowth. Such a waveguide is particularly useful for quasi phase matching.

Quasi Phase Matching and Wafer Bonding

The preferred embodiment for fabricating such a structure differs somewhat from that disclosed by Yoo in U.S. Pat. No. 5,434,700, incorporated herein by reference, and by Yoo et al. in "Quasi-phase-matched second-harmonic generation in AlGaAs waveguides with periodic domain inversion achieved by wafer-bonding," *Applied Physics Letters*, vol. 66, June, 1995, pp. 3410–3412. However, the broadest aspects of the method of the invention are described there. A version of this work has also been reported by Yoo et al. in "Wavelength conversion by quasi-phase-matched difference frequency generation in AlGaAs waveguides," *OFC '95, Optical Fiber Communications: Postdeadline Papers*, Feb. 26–Mar. 3, 1995, San Diego, paper #PD-14 and in "Transparent wavelength conversion by difference frequency generation in AlGaAs waveguides," *Technical Digest, OFC '96, Optical Fiber Communications*, San Jose, Calif., paper #WG-7, 1996, pp. 129–131.

Figure 3:
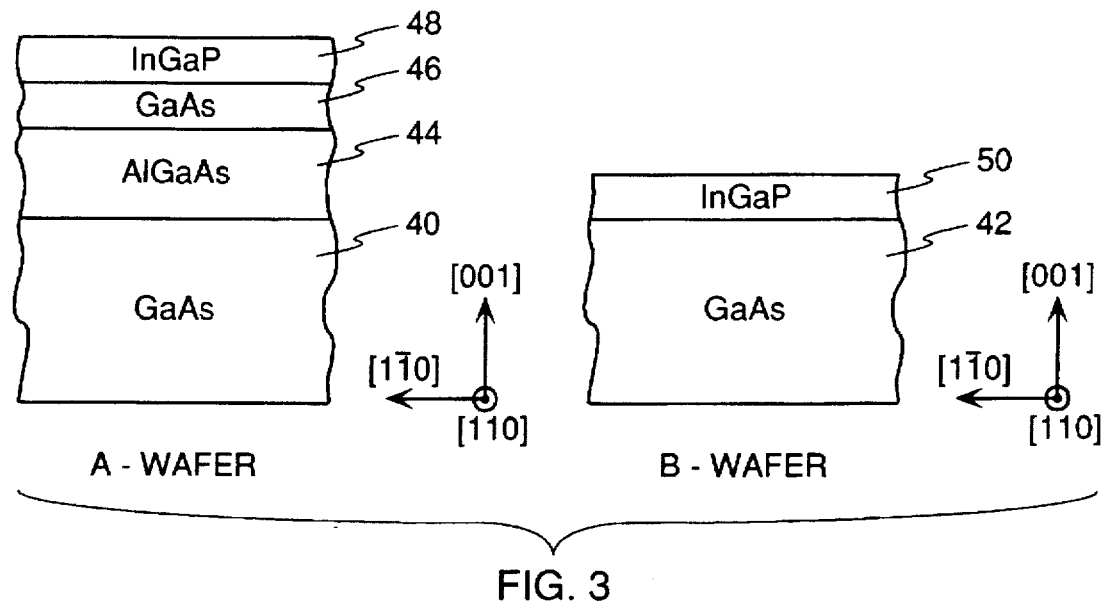
FIGS. 3 and 4 are cross-sectional views showing the bonding together of two exemplary wafer structures.

The process is described with reference to the following cross-sectional views. As shown in FIG. 3, two GaAs wafer substrates 40 and 42 are oriented with their |0,0,1| axes upwards for the epitaxial growth by organo-metallic chemical vapor deposition (OMCVD). The other two illustrated axes [1,-1,0] and |1,1,0| are not really relevant for the epitaxy but become important for determining the non-linear susceptibilities of the final structure. On the A-wafer 40 are grown a 1-μm thick $Al_{0.8}Ga_{0.2}As$ etch-stop layer 44, a 0.1-μm thick GaAs layer 46, and a 20-nm thick $In_{0.5}Ga_{0.5}P$ layer 48. Because of the epitaxial growth, all these layers 44, 46, 48 have the same crystalline orientation as the underlying A-wafer 40, that is, |0,0,1| upwards. Likewise, the B-wafer 42 is epitaxially deposited with a second 20-nm thick $In_{0.5}Ga_{0.5}P$ layer 50 having the same upwards |0,0,1| orientation as that of its substrate 42. These compositions are chosen for lattice matching, but thin strained layers are usable with the invention.

Figure 4:
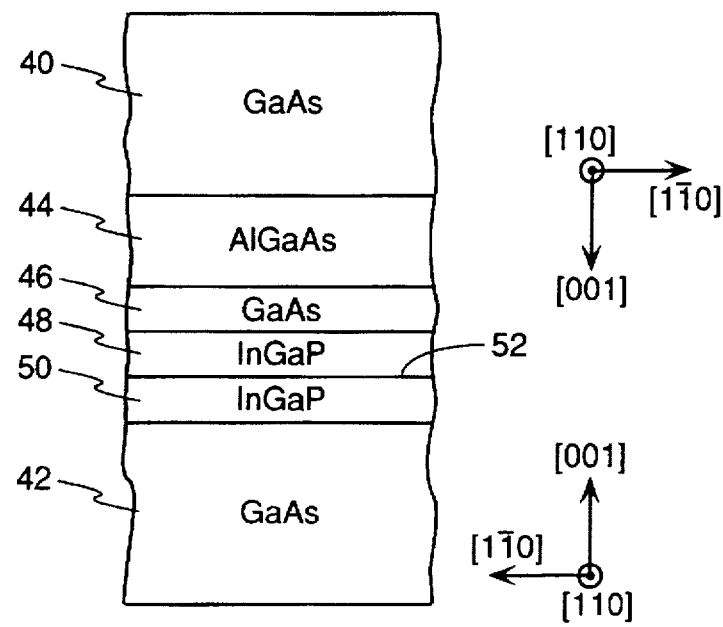

After the A- and B-wafers 40, 42 have been formed with the structure in FIG. 3, they are aligned with their upper surfaces facing each other across a bonding plane 52, as illustrated in FIG. 4, so that their respective |0,0,1| axes are opposed to each other. Also the two wafers are azimuthally oriented so that their respective |1,1,0| axes are parallel and their |1,-1,0| axes are anti-parallel. However, this alignment is not precise at the atomic level.

The two wafers are then bonded together. First, they are joined by van der Waals bonding at room temperature. In this process, the wafer surfaces to be bonded are washed with a strongly caustic liquid and then rinsed and dried. To produce hydrophobic surfaces, the caustic liquid can be concentrated HF. Such hydrophobic surfaces have minimal native oxides. To produce hydrophilic surfaces, the caustic liquid can be $H_2SO_4$. Such hydrophilically treated surfaces have a native oxide because of the caustic treatment. The two surfaces are aligned, as described above, and gently pressed together. Van der Waals bonding thereafter holds the wafers together. Hydrophilic surfaces produce stronger van der Waals bonding but yield poor interfaces due to the oxides. Hydrophobic surfaces produce weaker van der Waals bonding, but yield better interfaces.

After the van der Waals bonding, the wafers are fused together by a process for bonding by atomic rearrangement (BAR), as disclosed by Bhat et al. in U.S. Pat. No. 5,207,864 and by Lo et al. in "Bonding by atomic rearrangement of InP/InGaAsP 1.5 μm wavelength lasers on GaAs substrates," *Applied Physics Letters*, vol. 58, 1991, pp. 1961–1963. In the previously cited patent, Yoo discusses the BAR process, as applied to quasi-phase-matched waveguides. In the BAR process, the wafers are held together under moderate pressure in a reducing atmosphere of hydrogen while the temperature is raised to about that for OMCVD growth of the materials, that is, a temperature at which the atoms in the crystals can bond to form a crystal but can also rearrange on the interfacial surface. For InP-based materials, this temperature is about 650° C. The BAR process effectively bonds the two wafers together. The described process differs from that previously reported in that the BAR process is effected between the two layers 48 and 50 of the same InGaP composition, which greatly reduces the number of dislocations at the interface.

It is noted that the BAR bonding does not render the two wafers 40, 42 epitaxial to each other because of the inevitable small misalignment between the wafers, which may amount to less than 5°.

Figure 5:
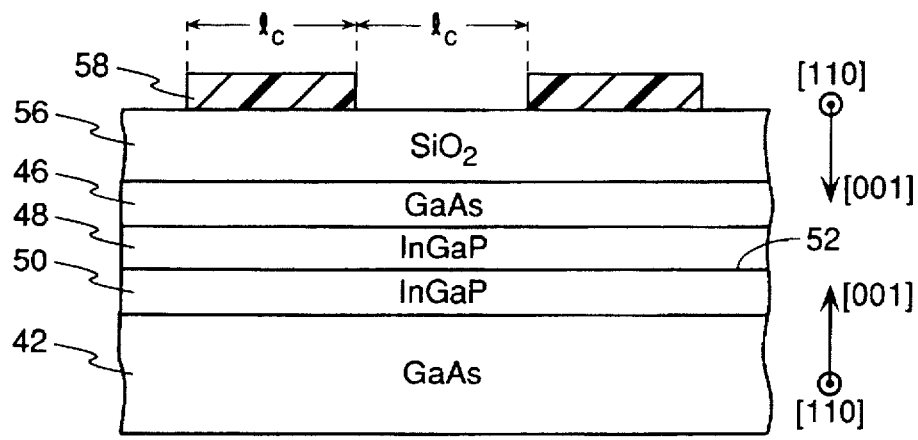
FIGS. 5 through 8 are cross-sectional views showing the formation in the bonded wafer structure of FIG. 4 of an epitaxial template having alternating domains of different crystallographic orientation.
Figure 6:
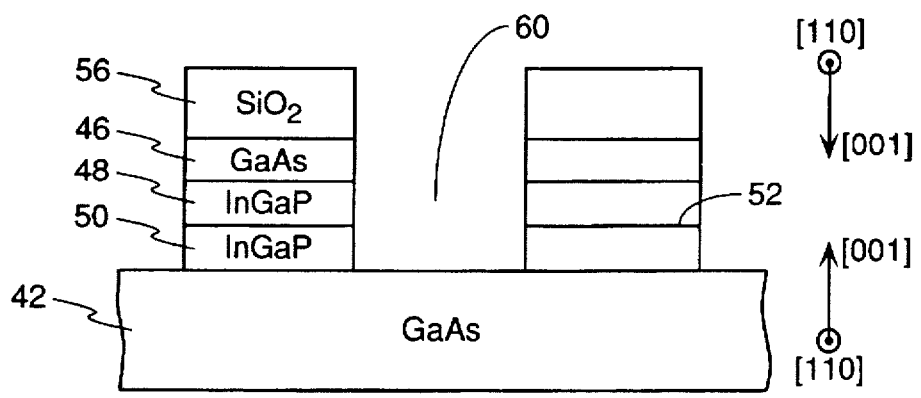

After the BAR process, the A-wafer GaAs substrate 40 is removed by a selective wet etching at room temperature using an etching solution of 8 volumetric parts of a mixture of $H_2O$ and monohydrate citric acid (1:1 by weight) and 1 part of $H_2O_2$ that stops at the AlGaAs etch-stop layer 44, and then the etch-stop layer 44 is removed by another selective wet etch with HF to produce the base structure illustrated in FIG. 5. A 150 nm-thick mask layer 56 of $SiO_2$ is plasma-CVD deposited over the base structure. Photoresist 58 is deposited on the structure and photolithographically defined into a grating pattern having alternating mask areas and apertures each of width equal to the coherence length $l_C$. The exposed underlying $SiO_2$ is etched with a dry-plasma etch of $C_2F_6$, and the photoresist is stripped to leave the $SiO_2$ layer 56 formed into a hard mask. The exposed GaAs layer 46 is selectively etched with $H_3PO_4:H_2O_2:H_2O$ (1:1:38 by volume), and then the exposed InGaP layers 48, 50 are selectively etched with $HCl:H_3PO_4$ (1:10 by volume), which stops at the GaAs substrate 42. The etching produces a grating structure having trenches 60, as illustrated in FIG. 6.

Figure 7:
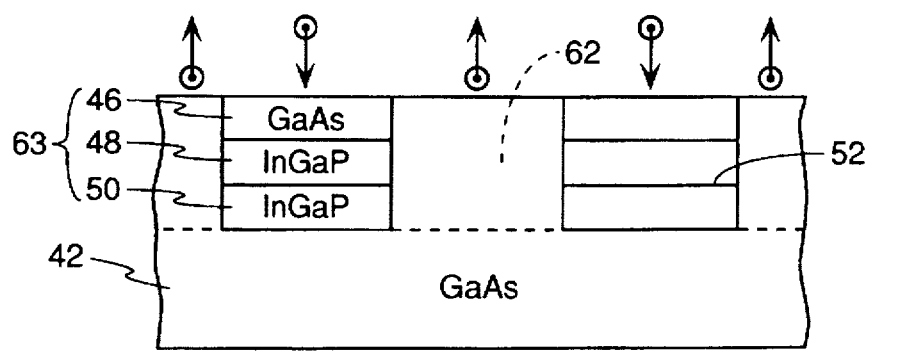

In a selective regrowth process, OMCVD is used to epitaxially deposit GaAs into the trenches 60 to form inverted-domain GaAs plugs 62, as illustrated in FIG. 7, substantially filling the trenches 60. The GaAs growth is selective because the $SiO_2$ material of the hard mask 56 prevents appreciable deposition thereover in the OMCVD process. Because these plugs 62 are epitaxially formed over the substrate 42 they grow with the crystallographic orientation of the substrate 42. In contrast, templating pads 63 formed of the remaining segments of the layers 46, 48, 50 have surfaces of the inverted crystalline orientation of the now removed, other substrate 40.

An alternative method of patterning the alternating templating pads 63 and plugs 62 does not include the $SiO_2$ layer 56. A photomasking and etching steps forms the templating pads 63 with the apertures 60 between the pads to expose the substrate 42. An unpatterned deposition of GaAs fills the apertures 60 but also overlays the templating pads 63. Then, a lapping or chemical mechanical polishing step removes enough material to expose the pads 63 and the plugs 62 remaining in the apertures 60, leaving a planarized surface. Thereby, selective area regrowth is not required.

Figure 8:
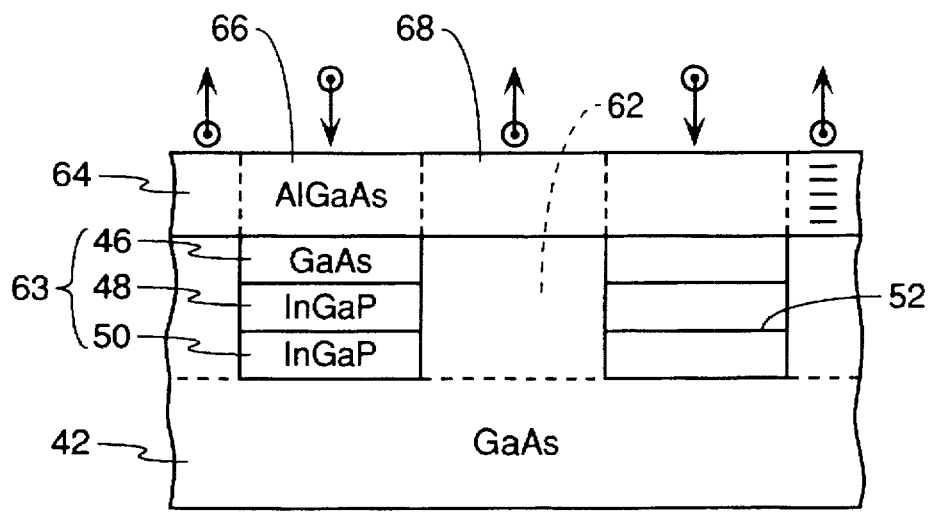

The $SiO_2$ layer 56 is removed with HF to leave a substantially planar surface of GaAs with the originally grown GaAs layer 46 having its [0,0,1] axis pointing downwards and the regrown GaAs plug 62 having its [0,0,1] axis pointing upwards. However, the regrowth of the plugs 62 may not leave a precisely level surface of sufficient quality to serve as an epitaxial template for growing an optical waveguide. Accordingly, as illustrated in FIG. 8, a planarization layer 64 is deposited by OMCVD. This layer 64 includes a large number of AlGaAs layers, with alternating layers being rich respectively in Ga and Al, in particular, 120 periods of alternating layers of 4 nm of GaAs and 6 nm of AlAs. The planarization layer 64 provides a smooth surface with alternating domains 66, 68 having the crystallographic orientation of the underlying original GaAs layer 46 or of the regrown GaAs plug 62. Because the two wafers 40, 42 are not precisely aligned, the crystallography of the domains 66, 68 is not precisely inverted but is sufficient for the desired quasi-phase-matching. This completes the formation of a template for the subsequent epitaxial formation of a waveguide with the domains of alternating orientation following those of the underlying portions of the template.

At this point, the discussion diverges for the infrared difference frequency generator and for the blue-green coherent source. We will first discuss the difference frequency generator.

Figure 9:
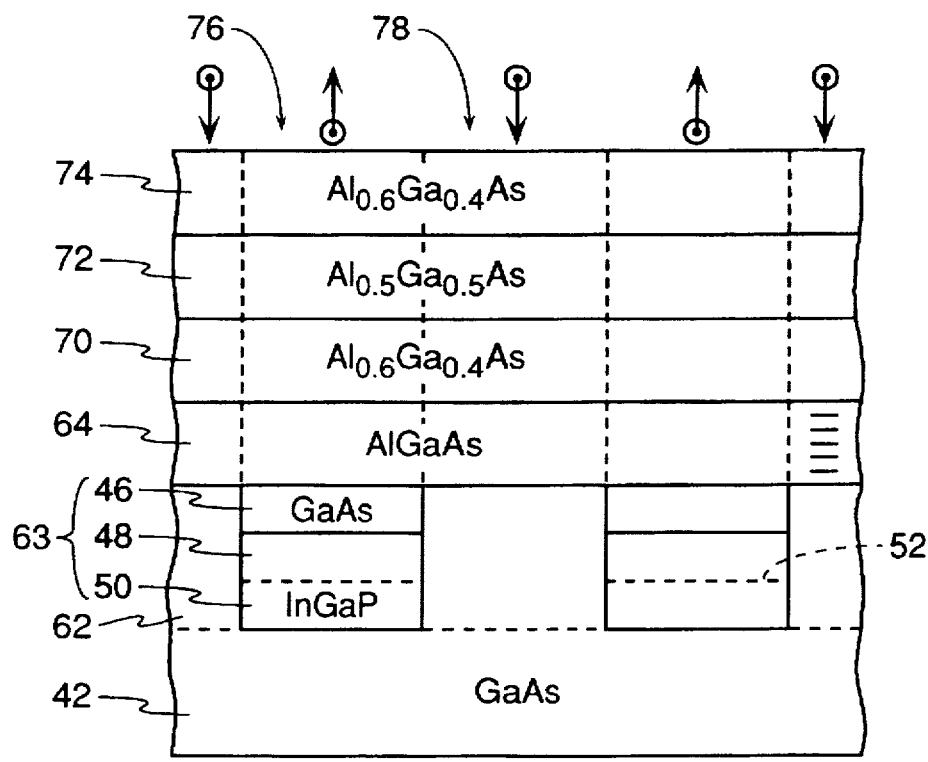
FIG. 9 is a cross-sectional view showing a quasi-phase-matched waveguide formed on the template of FIG. 8.

A vertical waveguide structure, as illustrated in FIG. 9, is then epitaxially grown over the template by OMCVD. The waveguide structure includes a 2 μm-thick lower cladding layer 70 of $Al_{0.6}Ga_{0.4}As$, a 1 μm-thick core layer 72 of $Al_{0.5}Ga_{0.5}As$, and a 2 μm-thick upper cladding layer 74 of $Al_{0.6}Ga_{0.4}As$. Pulsed growth of the three layers 70, 72, 74 of the waveguide structure is preferred in order to improve the morphology by smoothing the surface. In this technique, growth is periodically interrupted by stopping the flow of Al- and Ga-precursor gases for a short time, ten seconds in the example. Importantly, the epitaxial growth causes the alternating sections of the waveguide structure 76, 78, each of width $l_C$, to continue the periodic template orientation and thus to have alternately opposed crystallographic orientations. Thus, the sign of any second order non-linearity is reversed between the two sections, thereby providing quasi phase matching.

Waveguide Structure

Figure 1:
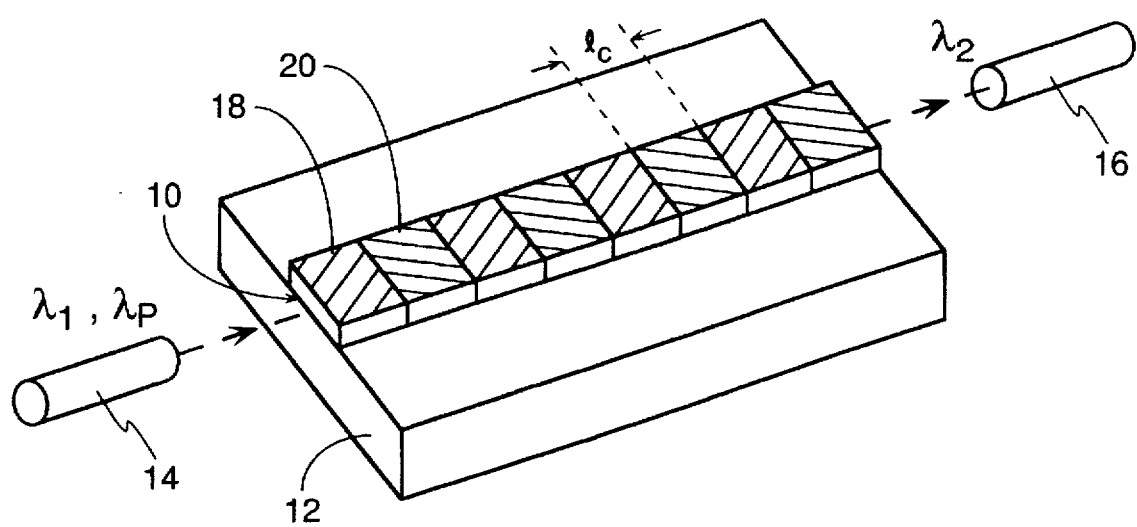
FIG. 1 is a perspective view of a quasi-phase-matched semiconductor waveguide formed on a substrate and useful for frequency conversion.
Figure 2:
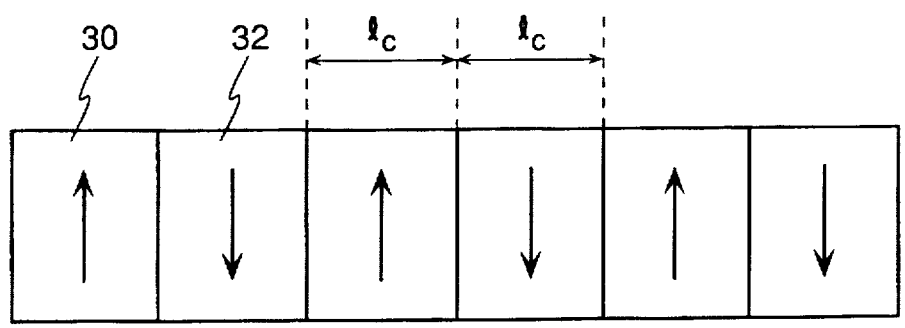
FIG. 2 is a schematical cross-sectional view of a quasi-phase-matched transmission and interaction path.

The waveguide needs to be laterally defined. One method includes masking the wafer deposited with the structure defined above to define a rib-loaded waveguide, similar to that shown in FIG. 1 extending along the |1,-1,0| direction. The non-masked portions away from the rib waveguide are etched by a diffusion-limited etchant $HCl:H_2O_2:H_2O$ (80:4:1 by volume).

There are several conventional forms of the lateral waveguide structure which can be used, although it is understood that other forms can be used and that the process for forming the final structure is usually inextricably involved with both processes for forming the vertical and horizontal structure.

Figure 10:
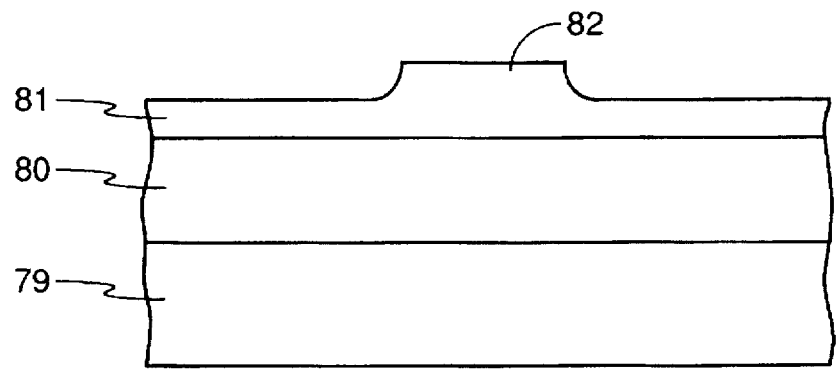
FIGS. 10, 11, and 12 are cross-sectional views of three types of optical waveguides formed in a substrate.

A first waveguide structure, referred to as the ridge waveguide and shown in the lateral cross-sectional view of FIG. 10, includes a substrate 79, a lower cladding 80, and an upper layer 81 of higher refractive index than that of the lower cladding 80. In this embodiment, the upper layer 81 includes both the planar core and a ridge 82 of the same material which serves to confine the optical mode primarily to the portion of the upper layer 81 and neighboring portions thereof underlying the ridge 82.

Figure 11:
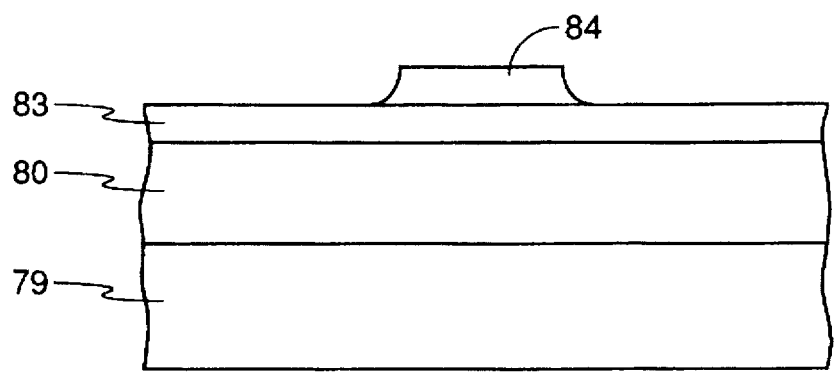

A second waveguide structure, referred to as the rib-loaded waveguide and shown in the lateral cross-sectional view of FIG. 11, includes a planar core layer 83 and a rib 84 formed over the lower cladding 80. The core layer 83 has a higher refractive index lower than those of the underlying lower cladding 80 and of the overlying rib 84. The rib 86 acts as an upper cladding so as to confine an optical mode generally to the core layer 83 but only to the area nearly underlying the rib 84.

Figure 12:
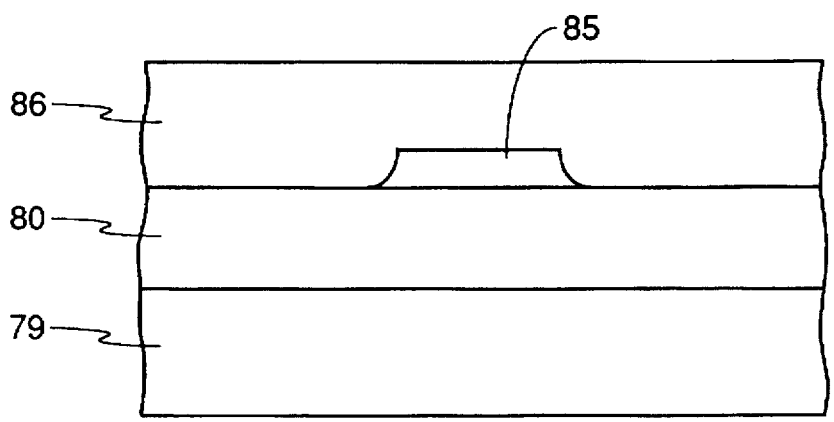

A third waveguide structure, referred to as the buried heterostructure waveguide and shown in the lateral cross-sectional view of FIG. 12, includes a high-index core ridge 85 formed on top of the lower cladding 80 of lower refractive index and an upper cladding 86 formed on the top and to the sides of the ridge 85 and having a lower refractive index than that of the core ridge 85.

These and other waveguide structures are available. We believe that the buried heterostructure waveguide offers many advantages related to low loss and tight optical confinement. To achieve good confinement and low loss for the interacting waves, the core layer typically has a thickness between 0.3 and 1.5 μm, and the ridge or rib typically has a thickness between 0.5 and 4 μm. The upper cladding should be as thick as possible to reduce the loss, but it is practically limited to 2 to 3 μm.

Experiment

Figure 13:
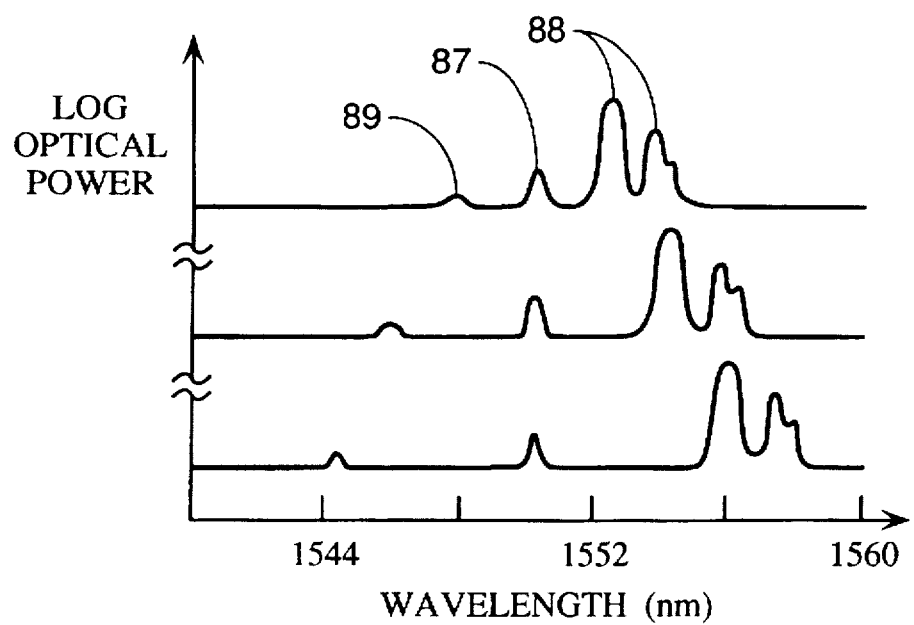
FIG. 13 is a graph showing the non-linear response as a function of wavelength for the quasi-phase-matched waveguide of FIG. 9.

A quasi-phase-matched AlGaAs waveguide suitable for infrared frequency conversion was formed according to the above process having a period ($2·l_C$) of 4 μm and extending along 3 mm. The waveguide was used for difference-frequency generation utilizing a tunable NaCl:OH (F-center) laser for the input signal and a $Ti:Al_2O_3$ laser for the pump wave. The pump wave was at 775 nm, and the input waves were selected to be at 1548, 1546, and 1544 nm for three parts of the experiments. The traces shown in FIG. 13 correspond to the different input signals and show the logarithm of the output power from the quasi-phase-matched waveguide that is irradiated with the input and pump signals. The signal 87 at 1550 nm is the second order diffraction response of the spectrometer for the pump signal which appears at 2·$\lambda_p$. The wave form of signal 88 represents a complex input signal $\omega_1$ that is tunable between the traces. In difference-frequency generation, the output signal $\omega_2$ is a mirror image 89 of the input signal $\omega_1$ reflected across half the pump frequency $\omega_p/2$ or twice the pump wavelength 2·$\lambda_p$. The output signal 89 follows this relationship with respect to the input signal 87 and the second-order diffraction pump signal 88. It is noted that the wavelength imaging of an optical signal with a complex wavelength distribution is useful for correcting dispersion that a long optical fiber introduces into a signal it transmits.

Frequency Doubler vs. Difference Frequency Generation

At least two types of phase matching are possible. For the difference-frequency generation discussed above, they are:

type I—a TM (transverse magnetic) pump wave mixing with a TE (transverse electric) input signal wave generating a TE output converted signal; and type II—a TE pump wave mixing with a TE (or TM) input signal wave generating a TM (or TE) converted output wave.

The article by Yoo in *Applied Physics Letters* has suggested using this structure for second harmonic generation. For this case there are two types of possible phase matching:

type I—a TE fundamental wave mixing with itself and thereby generating a TM fundamental second-harmonic wave; and type II—a TE fundamental wave mixing with a TM fundamental wave and thereby generating a TE second-harmonic wave.

In terms of difference-frequency generation, type II is preferred because polarization diversity is achieved since the TE mode is converted to a TM mode (and vice versa) and because the conversion efficiency is insensitive to polarization since the two processes of TE mode converted to TM and TM converted to TE are equal in strength and they occur simultaneously. This arrangement is also advantageous for integrating a laser to provide a TE pump wave.

In terms of monolithically integrating a laser with a nonlinear waveguide generating a second harmonic, type I is advantageous because semiconductor lasers emit TE radiation unless the gain media employ tensile-strained quantum wells.

Lasers and Non-linear Waveguide

Figure 14:
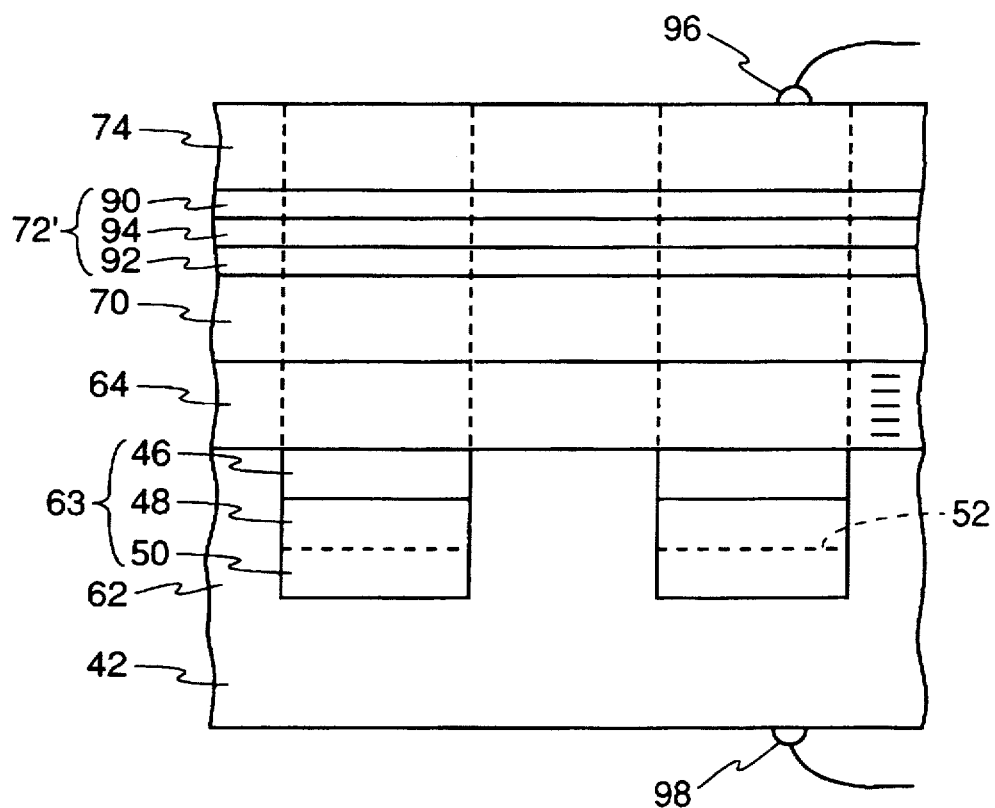
FIGS. 14 and 15 are cross-sectional views of two embodiments of the invention incorporating an active layer into the waveguide over a crystallographically differentiated substrate.

The monolithic integration of a laser is easily accomplished with the invention, as illustrated in the cross section of FIG. 14, by dividing an active core layer 72' into an upper layer 90 of a first conductivity type and a lower layer 92 of a second conductivity type sandwiching an active layer 94, which may include one or more quantum wells. The upper cladding layer 74 is doped to be of the first conductivity type, and at least the lower cladding layer 70 and possibly others of the lower layers 64, 46, 48, 50, 62, 42 are doped to be of the second conductivity type. Electrical contacts 96, 98 are placed above and below the structure sandwiching the active layer 94 to electrically bias the laser to lase at the pump wavelength.

Figure 15:
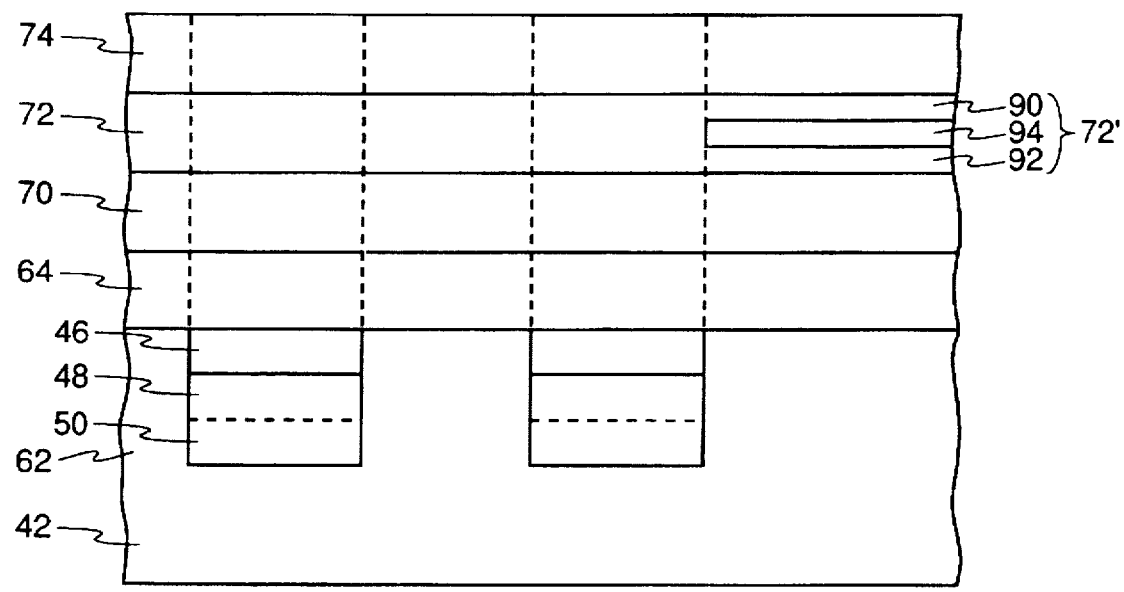

A related structure, illustrated in the cross section of FIG. 15, separates the active core layer 72' having an active layer 94 and not having alternating crystallographic domains from the inactive core layer 72 that lacks an active layer but that is composed of alternating crystallographic domains. The inactive core layer 72 is not differentially doped between its upper and lower parts. Although the active core layer 72' is illustrated as having the crystallographic orientation of the remaining GaAs substrate 42, the structure can be slightly modified so that it has the inverted orientation of the GaAs layer 46.

Figure 16:
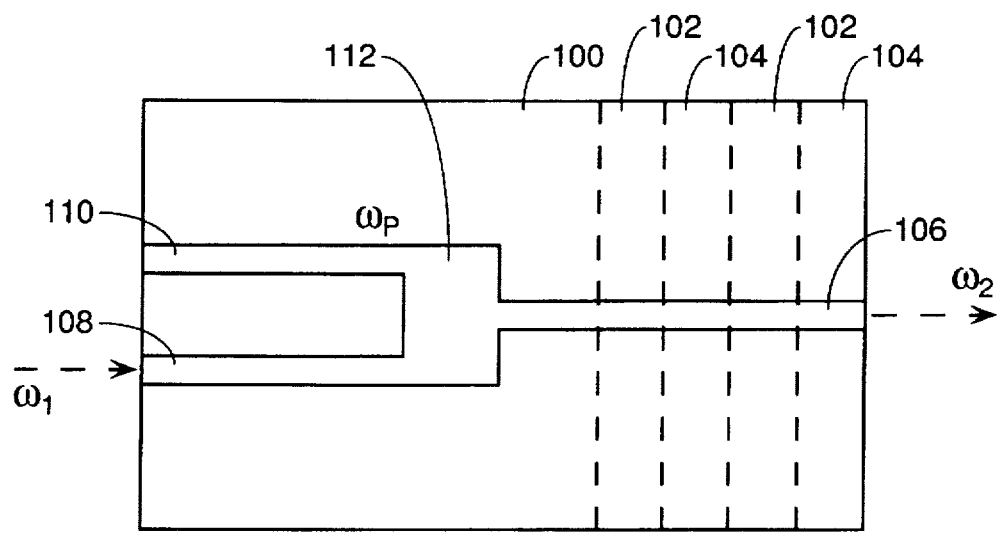
FIG. 16 is a plan view showing a Y-shaped coupling of a waveguide and an active region particularly usable with a parametric wavelength converter.

The functional structure illustrated in FIG. 15 can be adapted to a wavelength converter system, illustrated in plan view in FIG. 16, which is integrated onto an opto-electronic integrated circuit chip 100. The right side of the chip includes alternating crystallographic domains 102, 104 across which an inactive, quasi-phase-matched waveguide 106 is epitaxially formed. The left side of the chip 100 that is not crystallographically differentiated includes an inactive, axially homogeneous semiconductor waveguide 108 and an active semiconductor waveguide 110 configured as a laser, as in the right hand side of FIG. 15. The three waveguides are joined in a coupling region 112.

The active waveguide 110 is designed to lase at the pump frequency $\omega_p$, and the inactive, homogeneous waveguide 108 receives the input signal $\omega_1$. The coupling region combines these two signals onto the quasi-phase-matched waveguide 106, which thereby outputs the frequency-converted output signal $\omega_2$. This configuration is particularly advantageous because the optical signals $\omega_1$, $\omega_2$ do not pass through the active region, thereby avoiding possible attenuation by free-carrier absorption.

The coupling region 112 can be advantageously implemented as a multi-mode interference filter of the sort described by Soldano et al. in "Optical Multi-Mode Interference Devices Based on Self-Imaging: Principles and Application," *Journal of Lightwave Technology*, vol. 13, 1995, pp. 615–627. Such a multi-port filter can be designed to have high coupling efficiency between the input waveguide 108 and the quasi-phase-matched waveguide 106 at the input wavelength, e.g. 1550 nm, and simultaneously have high coupling efficiency between the pump waveguide 110 and the quasi-phase-matched waveguide 106 at the pump wavelength, e.g. 775 nm.

Although the invention to this point has been described in terms of a wavelength converter based on difference-frequency generation and second harmonic generation, the quasi-phase-matched grating of the invention achieved by wafer bonding can be applied to other uses, particularly in optical storage, wavelength-division communication networks, sum frequency generation, optical parametric amplification, and optical parametric oscillation. Sum frequency generation is a process in which two input optical waves interact in the non-linear optical medium to generate an output optical wave whose frequency corresponds to the sum of the two input frequencies. Second harmonic generation is a special case of sum frequency generation in which the two input waves are one and the same. The first Yoo et al. paper describes a second-harmonic generator. Yoo describes wavelength conversion by difference frequency generation in U.S. Pat. No. 5,434,700, and this is a parametric process because the pump signal causes both the input signal and output signal to grow. Parametric amplification of the input signal can overcome background loss in the device when the pump level exceeds a threshold level. This parametric gain is free of classical noise and can achieve amplification that is limited only by quantum noise. If such a parametric gain medium is included within an optical cavity to provide feedback, it can cause the oscillation of optical waves. This is called a parametric oscillator. Parametric oscillators can be used as a tunable coherent source over a wide wavelength range.

The invention is not limited to the described materials, which are particularly appropriate for frequency converters in a communication network utilizing silica fibers. Other non-centrosymmetric crystalline materials can be used. The two materials constituting the grating need not be the same. The II-VI semiconductor structure ZnSe—ZnCdSe—ZnSe can be grown with negligible lattice mismatch on the GaAs-based template of FIG. 8. The ZnSe waveguide allows a visible coherent source to be implemented by means of second harmonic generation.

Frequency-Doubled Blue-Green Source

A second important application of the invention is as a source of frequency-doubled laser radiation, particularly useful in the blue-green portion of the optical spectrum. By the use of integrated-circuit fabrication techniques, a pump laser emitting at half the frequency (twice the wavelength) of the desired radiation can be integrated on the same substrate as a quasi-phase-matched grating which acts as a second harmonic generator to double the frequency of the laser's output.

Figure 17:
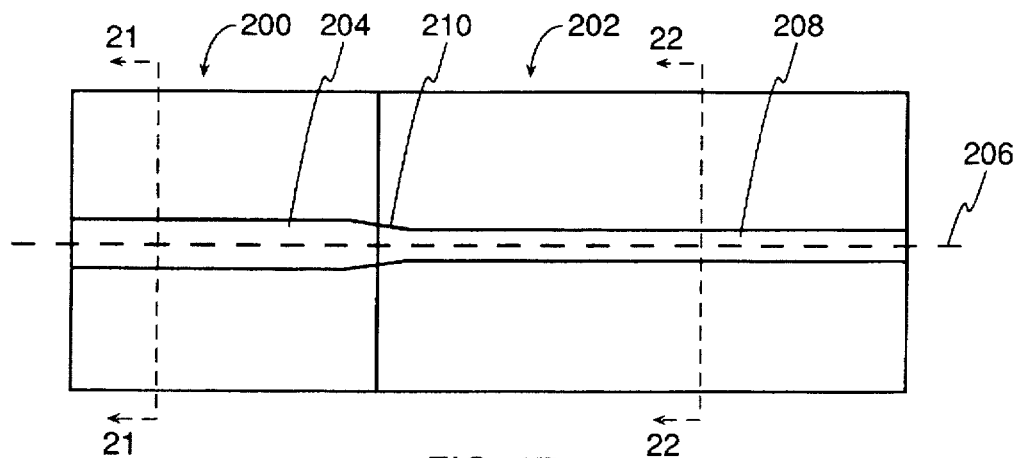
FIG. 17 is a plan view of a laser integrated with a non-linear waveguide in a substrate.

The general structure, illustrated in plan view in FIG. 17, includes on a single substrate a laser section 200 and a frequency-doubler or QPM section 202. The laser section 200 includes an active waveguide 204 that is aligned along an optical axis 206 and acts as a diode laser when vertically biased by an electrical source. The frequency-doubler section 202 includes a QPM (quasi phase matched) waveguide 208 that is aligned along the optical axis, is composed of a grating of materials of alternating non-linearity so as to provide quasi phase matching and thus to double the optical frequency of the output of the laser section 200. A taper coupler 210 may be included between the two waveguides 204, 208 to increase the efficiency of optical coupling. The laser waveguide 204 is based on well known technology and can, among other possibilities, be a distributed feedback (DFB) laser or a distributed Bragg reflector (DBR) laser, but the dielectric modulation that tends to occur in a QPM grating may provide sufficient frequency locking for the laser so that no frequency locking would be required on the laser itself.

The QPM waveguide 208 imposes several restraints on its material composition. It must be transparent in both the spectral band of the pump radiation and at the desired frequency-doubled radiation in the blue-green region. Ideally, the QPM grating should not produce the effect of a refractive-index grating, although in practice there is a small index modulation, which may be enough to lock the laser frequency. Transparency in the shorter-wavelength visible is a difficulty. Also, the material of the QPM waveguide must have a non-centrosymmetric crystal structure so as to exhibit optical non-linearities for the desired frequency doubling. Finally, it is preferred that the non-linear material be compatible with the materials used for the integrated laser, typically III-V semiconductors such as AlGaAs. For non-compatible materials, a multi-step wafer bonding process, to be described later, may be required.

Wide-bandgap zinc-blende semiconductors, including many II-VI compounds, satisfy these requirements. The most popular combination is ZnSe for the waveguide core and ZnCdSe for the waveguide cladding. However, there are many similar compounds that can be useful, for example, ZnS, ZnMgSe, ZnMgSSe, ZnCdMnSe, ZnCdMnS, ZnTe, ZnCdTe, ZnMgTe, ZnMgS, ZnMgSTe, ZnCdMnTe, ZnCdMnTe, etc. These materials are all in the material family (Zn, Cd, Mg, Mn)(S, Se, Te).

Experiment

Figure 18:
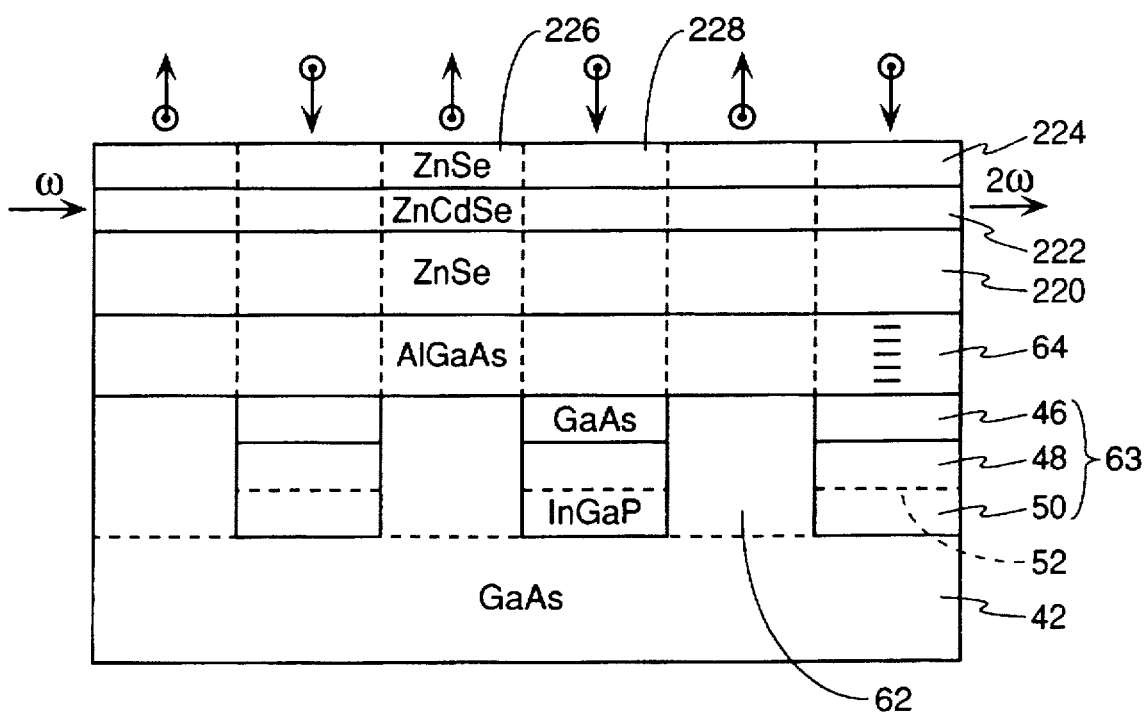
FIG. 18 is longitudinal cross-sectional detailed view of an embodiment of the non-linear waveguide of the invention, particularly usable for a source of blue-green light.

A prototype structure was grown and tested that demonstrated the feasibility of using quasi phase matching to frequency-double laser radiation into the blue-green. The test structure is shown in the longitudinal cross-sectional view of FIG. 18 and includes a ZnCdSe ridge waveguide structure epitaxially deposited on the AlGaAs template of FIG. 8. The waveguide structure included a bottom cladding layer 220 of ZnSe with a thickness of 2 µm, a core layer 222 of ZnCdSe with a thickness of 0.5 µm, and an upper cladding layer 224 of ZnSe with a thickness of 0.5 µm. The ZnCdSe had less than 6% Cd, that is, $Zn_{0.94}Cd_{0.06}Se$ produced good morphology and acceptable strain when grown on a GaAs substrate. Because of the underlying template, the ZnCdSe waveguide structure formed as alternating domains 226, 228 having their respective crystallographic |001| axes pointed in anti-parallel directions.

The ZnCdSe waveguide structure was grown by molecular beam epitaxy (MBE), a well known technique. A nucleation layer was first formed on the AlGaAs template, as has been described by Ruvimov et al. in "Nucleation and evolution of misfit dislocations in ZnSe/GaAs (001) heterostructures grown by low-pressure organometallic vapor phase epitaxy," *Applied Physics Letters*, vol. 68, 1996, pp. 346 et seq. and by Bourret-Coucheana, "On the origin of stacking faults at the GaAs/ZnSe heterointerface," *Applied Physics Letters*, vol. 68, 1996, pp. 1675 et seq. A 2.6 µm-wide ridge was etched with $KMnO_4$:$H_2SO_4$:$H_2O$ (100 mg:10 ml:40 ml). Three test structures were formed having respective domain periods in the QPM grating of 2.25, 2.50, and 2.75 µm.

Figure 19:
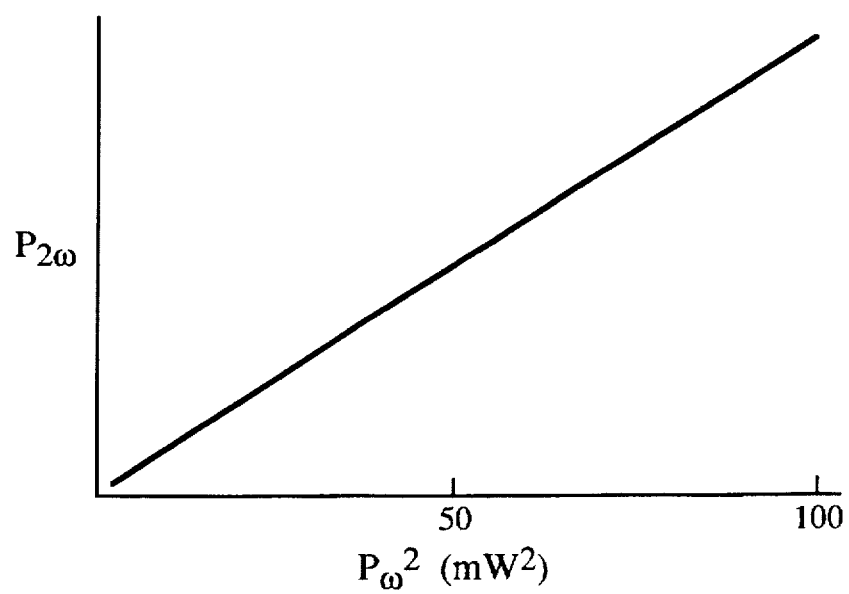
FIG. 19 is a graph of the experimentally determined frequency doubling of the structure of FIG. 18.

The test structures were tested by inputting an optical beam of 1.064 µm wavelength from a Nd:YAG laser into the test structures and monitoring the output radiation at 532 nm as a function of temperature between −21° C. and 65° C. Maximum second harmonic generation was observed at −15° C. for the domain period of 2.50 µm. The intensity of the second harmonic signal is plotted in FIG. 19 as a function of the square of the input power at the fundamental frequency. The quadratic dependence clearly indicates a second-order effect, as occurs in second harmonic generation in a non-linear optical medium. The tuning curve for the structure with the domain period of 2.25 µm indicated a peak temperature beyond 65° C., while that for 2.75 µm showed no measurable second harmonic generation. These values indicate that a room-temperature blue-green optical source can be obtained with a domain period near 2.40 µm although many parameters need to be optimized in the growth process.

Figure 20:
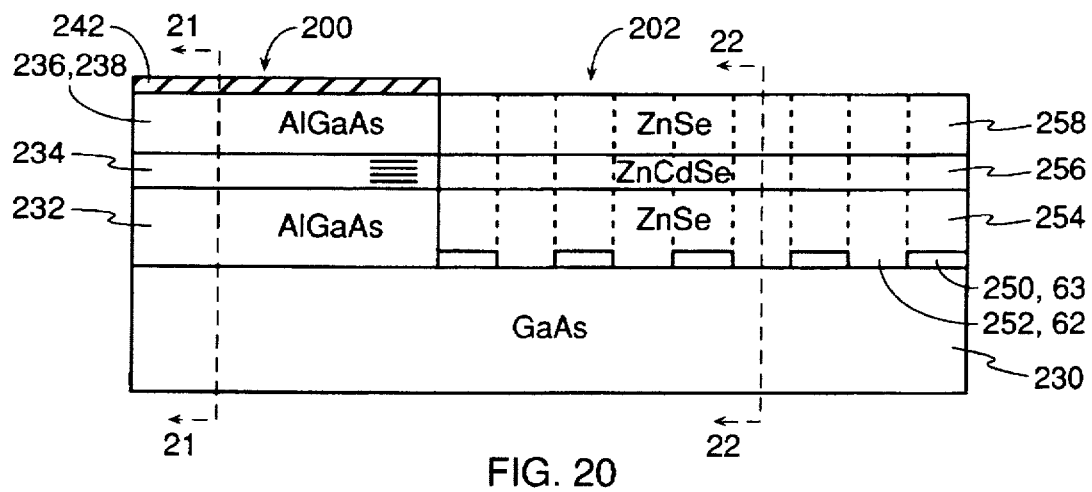
FIG. 20 is a longitudinal cross-sectional view of one embodiment of the integrated structure of FIG. 17.
Figure 21:
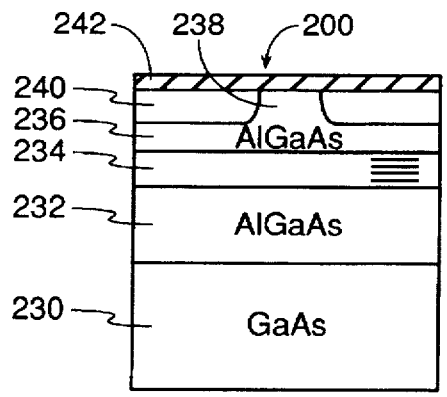
FIGS. 21 and 22 are lateral cross sectional views of the integrated structure of FIGS. 17 and 20 taken along sectional lines 21—21 and 22—22.
Figure 22:
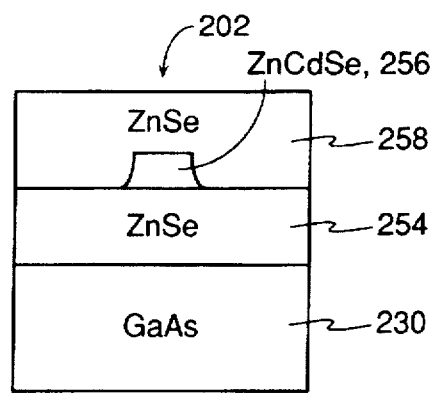

A preferred embodiment of a blue-green laser will now be described in detail. Its plan view has already been presented in FIG. 17. Its longitudinal cross section is illustrated in FIG. 20, and two lateral cross sections are illustrated in FIG. 21 and 22 respectively for the laser section and the QPM section. These drawings are somewhat simplified from those previously presented and in several cases combine functionally related layers into a single layer. The compositions presented in this embodiment are given only as examples, and others may be used.

The combined structure is fabricated on a doped GaAs substrate 230. It is assumed that the bottom doping is n-type and the top doping is p-type, but the opposite can be used.

In the laser region 200, over the n-type substrate 230 are formed an n-type lower cladding layer 232 of AlGaAs, an undoped multi quantum well layer 234 to be described in more detail later, a p-type upper cladding layer 236 formed into a ridge 238, an insulating layer 240, and a highly conductive layer 242 electrically contacting the ridge 238. The two electrical leads from the DC electrical source to the highly conductive layer 242 and to the substrate 230 are not illustrated. The compositions of these regions are chosen in view of the desired fundamental frequency of the pump laser. The insulating layer 238 acts both as a current block around the ridge 238 and as part of the optical confinement structure.

In the QPM region 202, templating pads 250 are formed having an inverted crystalline orientation relative to that of the underlying substrate 230. Apertures 252 formed between the templating pads 250 expose the underlying substrate 230. The templating structure has been simplified, the full structure being shown in FIG. 18. Over the templating structure is formed the QPM waveguide structure that includes a lower cladding layer 254 of ZnSe, a core layer 256 of ZnCdSe, and an upper cladding layer 258 of ZnSe. These materials are exemplary only. The QPM waveguide structure provides the desired non-linear interaction and quasi phase matching for the light confined within the waveguide structure. All layers in the QPM region 202 are undoped.

The cladding layers and especially the core layers are substantially aligned between the active regions 200 and the QPM region 202. The laser region 200 does not have the underlying alternating templating pads 250 and apertures 252, but material of either crystalline orientation can be used there.

Two examples will be given which use somewhat different structures for the multi quantum well layer 234 in the active region 200, and have different thicknesses and compositions of other parts of the associated active and QPM waveguide structures.

Figure 23:
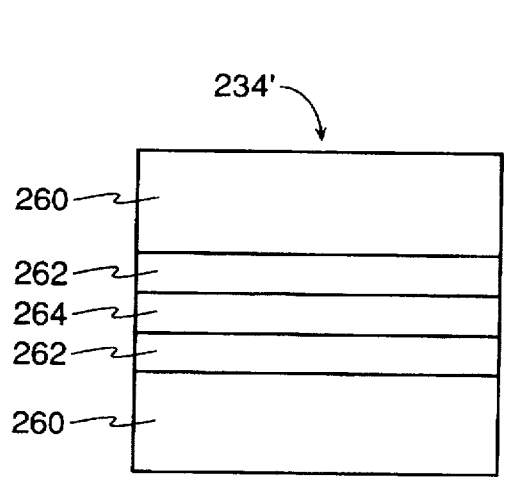
FIGS. 23 and 24 are cross-sectional views of two embodiments of the quantum-well region of diode lasers to be integrated in the structure of FIGS. 17 and 20.

The multi quantum well region 234' shown in cross section in FIG. 23 is designed for a 980 nm diode laser for which the second harmonic generator produces an output at 490 nm. It includes two 28 nm-thick guide layers 260 of $Al_{0.2}Ga_{0.8}As$, between which are formed two 8 nm-thick well layers 262 of $In_{0.2}Ga_{0.8}As$ separated by a 6 nm-thick barrier layer 264 of $Al_{0.2}Ga_{0.8}As$. With this quantum well region 234', both cladding layers 232, 236 are composed of $Al_{0.48}Ga_{0.52}As$. The lower cladding layer 232 has a thickness of 2.2 µm, and the upper cladding layer 236 has a thickness of 2.2 µm in the vicinity of the ridge 238 but a thickness of only 0.2 µm on the sides. The contact layer 242 is p⁺-type GaAs. For the associated QPM region 202, the lower ZnSe cladding layer 254 has a thickness of 2 µm, the $Zn_{0.94}Cd_{0.06}Se$ core layer 256 has a thickness of 0.5 µm, and the upper ZnSe cladding layer 256 has a thickness of 0.2 µm.

Figure 24:
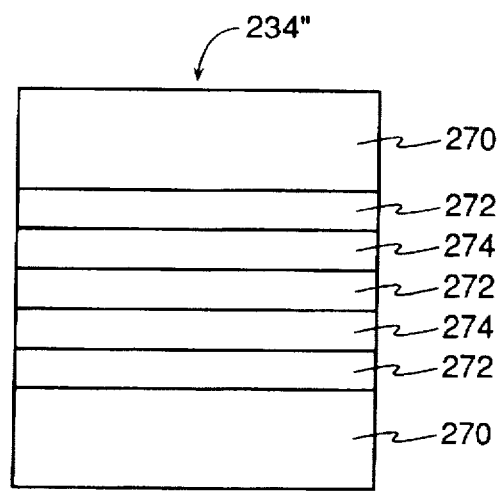

The multi quantum well region 234" shown in cross section in FIG. 24 is designed for a 860 nm diode laser for which the second harmonic generator produces an output at 430 nm. Two 10 nm-thick guide layers 270 of $Al_{0.3}Ga_{0.7}As$ bracket three 8 nm-thick well layers 272 separated by two barrier layers 274 of $Al_{0.3}Ga_{0.7}As$. The cladding layers 232, 236 and the contact layer 242 remain the same as in the previous example except that the lower cladding layer 232 has a slightly increased thickness of 2.4 µm. For the associated QPM region 202, the lower cladding layer 254 is 2 µm thick and is composed of $Zn_{0.91}Mg_{0.09}S_{0.19}Se_{0.81}$, the core layer 256 is 0.9 µm thick and is composed of $Zn_{0.94}Mg_{0.06}S_{0.13}Se_{0.87}$, and the upper cladding layer is 0.5 µm thick and composed of $Zn_{0.91}Mg_{0.09}S_{0.19}Se_{0.81}$.

Growth Process

Figure 25:
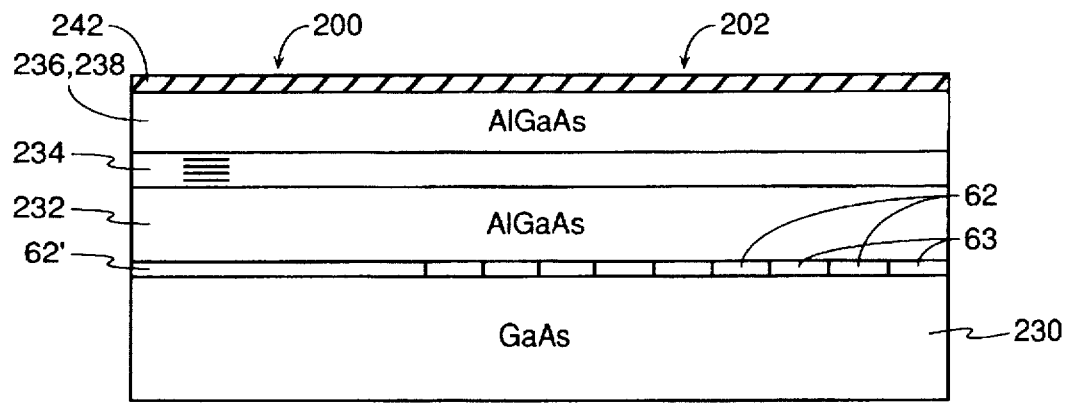
FIGS. 25, 26, and 27 are longitudinal cross-sectional views of the integrated laser and frequency converter during stages of their fabrication.

The growth process will now be described with reference to FIG. 25. The process begins with the GaAs template shown in FIG. 8 which includes in the QPM region 202 the alternating templating pads 63 and plugs 62 having inverted crystalline orientation between them. However, the mask used to produce the GaAs template is modified so that in the laser region 200 a uniform layer 62' is formed at the same time and with the same composition and orientation as the plugs 62. An AlGaAs planarization layer can be grown, but it may not be needed since ZnSe itself provides reasonably good planarization. A horizontally uniform laser structure is then grown over the GaAs template including the AlGaAs lower cladding layer 232, the multi quantum well layer 234, and the upper cladding layer 236.

Figure 26:
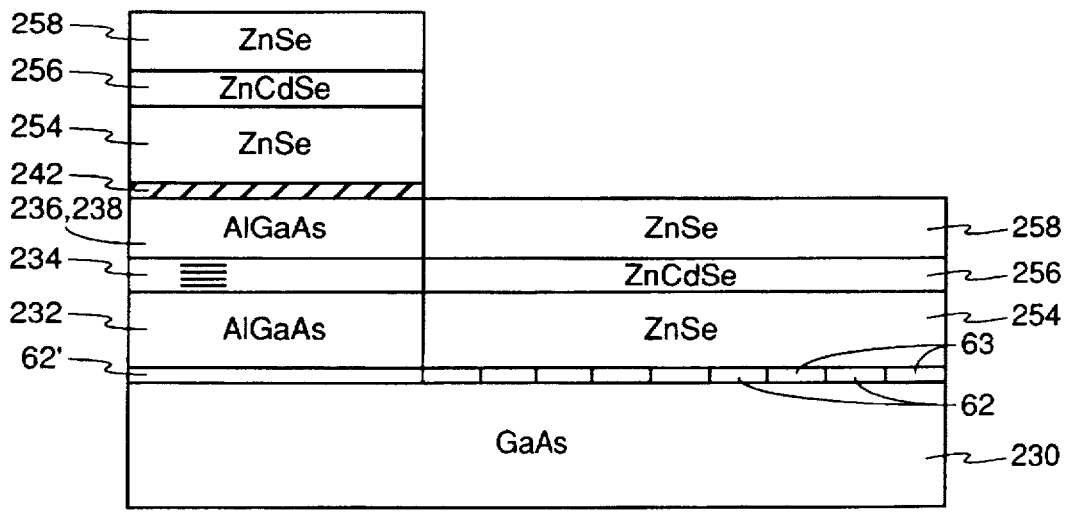
Figure 27:
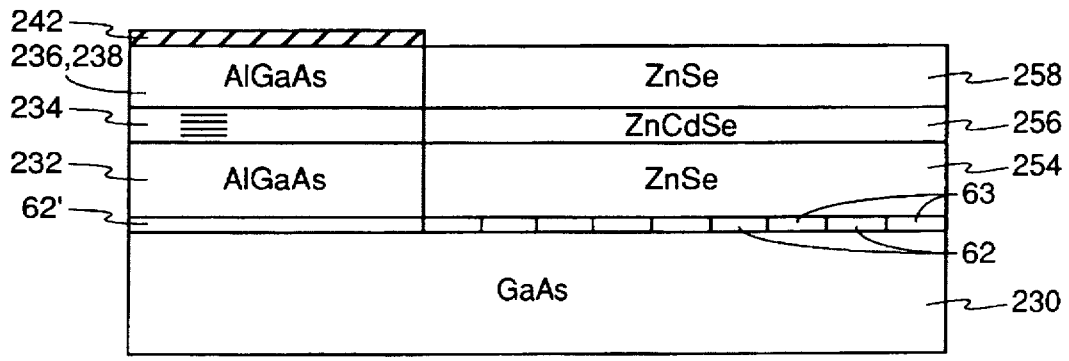

As shown in the cross sectional view of FIG. 26, the QPM structure is epitaxially grown both over the highly conductive layer 242 in the laser region 200 and over the templating structure 62, 63 in the QPM region 202. The figures show compositions of ZnSe and ZnCdSe for ease of understanding; however, as will be explained later, many classes of material can be used, and the preferred compositions given above are related but different. The QPM structure includes the lower cladding layer 254, the core layer 256, and the upper cladding layer 258. After these three layers have been grown, a photolithographic step defines the core ridge 256, and another layer of the material of the upper cladding layer 258 is regrown to cover the ridge. The unnecessary areas of the QPM layers 254, 256, 258 overlying the laser structure are selectively removed using photomasking and etching to produce the structure shown in FIG. 27.

The laser waveguide ridge is then defined, planarized with the insulating layer 238, and covered with the highly conductive layer 242.

The waveguide structure described above for a blue-green light source combines an active medium and a non-linear medium in a single monolithic waveguide. The waveguide can be operated in different modes depending on the configuration. In one configuration, the entire waveguide can be operated as a laser cavity by placing reflectors outside the combination of active and non-linear waveguide sections, thus producing intracavity non-linear conversion in the non-linear medium. In a second configuration, the laser section 200 includes reflectors at each end so as to operate as the laser, and the QPM section 202 is a passive waveguide butt coupled to the laser. In a third configuration, the laser section 200 is also operated as a laser, and the QPM section 202 is a passive waveguide but it also provides frequency-selective feedback to the laser by means of its Fabry-Perot characteristic.

The first configuration is most preferred since it offers the highest conversion efficiency with excellent stability. For the first configuration, the exit facet of the QPM waveguide 202 should have a high reflectivity or the terminal portion of the QPM waveguide 202 should include a DBR grating to provide feedback at the fundamental wavelength. For the second configuration, a DBR grating is imposed on the butt-coupling end of the laser section 200 and an anti-reflective coating is applied to the exit facet of the QPM waveguide 202. The third configuration can be achieved by high reflectivity at both the coupling interface between the two sections 200, 202 and at the exit facet of the QPM waveguide 202. However, this configuration presents difficulties in stabilization since the cavity resonance wavelengths of the laser and QPM sections 200, 202 must always be matched.

Although the process described above first grew the QPM layers and then the laser layers, the order can be reversed.

The two detailed embodiments have both involved III-V or II-VI zinc-blende semiconductors for the grating or other patterned structure including two crystalline states or orientations. However, the BAR bonding process or similarly effective bonding process can be applied to nearly all classes of materials, and the two bonded surfaces do not even need to be of the same or similar material, especially if a more complex BAR bonding process is used.

Alternative Structures

Figure 28:
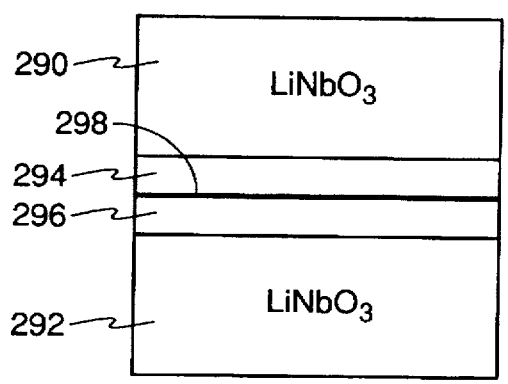
FIGS. 28 and 29 are cross-sectional views of structures involving materials other than semiconductors to which the invention can be applied.

In a first example, illustrated in FIG. 28, two substrates 290, 292 of the perovskite material LiNbO$_3$ have layers 294, 296 formed on their respective surfaces. The layers 294, 296 can be LiNbO$_3$ or other perovskite material compatible with LiNbO$_3$ so as to form with the crystalline orientation of its substrate. Of particular interest are proton-exchanged layers 294, 296 formed in the substrates 290, 292 by dipping the substrates into an acid. The extra protons in the LiNbO$_3$ surface layers 294, 296 increase the refractive index so that the proton-exchanged layers 294, 296 can act as waveguide cores relative to the substrates 290, 292. Other forms of doping or epitaxial growth can be used. The two substrate structures are then bonded together across a bonding interface 298 between their layers 294, 296. One substrate 290 is then removed, and its surface layer 294 is patterned and etched to partially expose the surface layer 296 of the other substrate 292. If the original epitaxial growth was performed with both surfaces having the perovskite c-axis pointing in a common direction, then the patterning will create a pattern of the c-axis alternating between different portions of the pattern.

Figure 29:
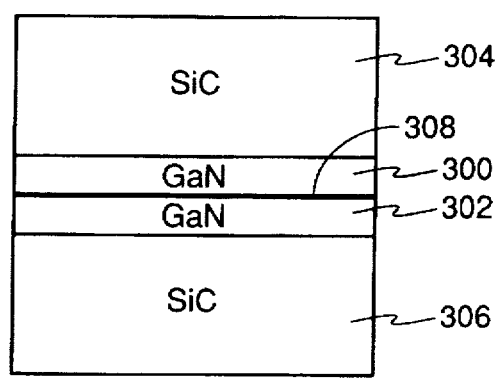

A second example involves semiconductors not having a zinc-blende structure. Gallium nitride (GaN) is a wide bandgap semiconductor. Even though it is a III-V semiconductor, it tends to form with a wurtzite crystal structure when grown on substrate of hexagonal or wurtzite silicon carbide (SiC) or when grown on the c-face or a-face of a sapphire substrate. Both the SiC substrate and GaN semiconductor are useful for high-temperature semiconductors. As illustrated in the cross section of FIG. 29, two wurtzite GaN layers 300, 302 are epitaxially deposited on respective SiC substrates 304, 306. They are then bonded together across a bonding interface 308, and similar etching and patterning is performed as in the last example.

Figure 30:
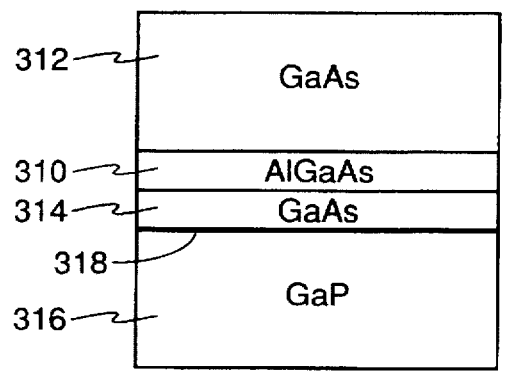
FIGS. 30, 31, and 32 are cross-sectional views of a process for bonding together dissimilar materials.

When significantly different materials are involved, it may be advantageous to use a two-step BAR process. As illustrated in the cross-sectional view of FIG. 30, a 100 nm-thick etch stop layer 310 of Al$_{0.7}$Ga$_{0.3}$As is epitaxially deposited on a GaAs substrate 312. A 100 nm-thick GaAs layer 314 is then grown on the etch stop layer 310. This structure is then bonded to a GaP substrate 316 across a bonding interface with the GaAs layer 314 adjacent to the GaP substrate 316. GaP layers or layers of related materials may have already been formed on the GaP substrate 316.

The GaAs substrate 312 is then etched away with an etchant stopping on the AlGaAs etch stop layer 310. A final, carefully controlled etch removes the 100 nm of the AlGaAs layer 310. This leaves a thin, precisely formed GaAs layer 314 over and bonded to the GaP substrate 316.

Figure 31:
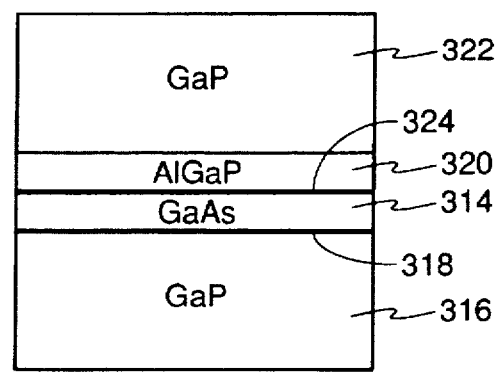

As shown in the cross-sectional view of FIG. 31, an Al$_{0.1}$Ga$_{0.9}$P layer 320 is grown on a third GaP substrate 322. This structure is then bonded to the structure remaining from the first two GaP substrates 312, 316 such that the AlGaP layer 320 contacts the GaAs layer 314 across a second bonding interface 324.

Figure 32:
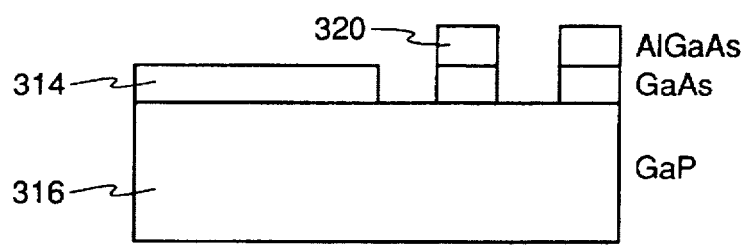

The third GaP substrate 322 is removed by mechanical lapping followed by a dry etch in an electron cyclotron resonance (ECR) plasma with an etching gas of Ar and H$_2$, which stops on AlGaP. The AlGaP layer 320 and GaAs layer 314 are then patterned and etched as required. A pattern useful for the integrated blue-green light source is shown in the cross-sectional view of FIG. 32. In a laser region, a uniform GaAs layer 314 is formed, which is used for the growth of an active AlGaAs structure, which is lattice matched to GaAs. In the QPM region, there is an alternating pattern of templating pads formed of segments of the AlGaP layer 320 and exposed portions of the GaP substrate 316. If the bonding of FIG. 31 were performed with anti-parallel crystalline orientations of the two substrates 316, 322, then the alternating pattern in the QPM section has alternating crystallographic orientations, which is useful for the growth of a ZnMgSSe QPM waveguide that is nominally lattice matched to GaP.

The bandgaps of ZnMgSSe lattice matched to GaP have shorter wavelengths than that of this material family when lattice matched to GaAs. Thus, this combination offers a light source for deep blue, violet, or ultraviolet.

The short-wavelength coherent optical source provided by the invention can be applied to many uses, but an important commercial use is for optical recording, both for reading and writing. The shorter wavelength allows much denser recording and hence for higher-capacity media, such as compact disks.

Although a simple periodicity for the grating has been described, the fabrication process can be applied to more complex periodicities, including higher-order periodicities and aperiodic perturbations of the periodicity and even to alternating domains having no readily discernible periods. Bortz et al. disclose in "Increased acceptance bandwidth for quasi-phasematched second harmonic generation in LiNbO$_3$ waveguides," Electronics Letters, vol. 30, 1994, pp. 34, 35 a design including long range modulation in the grating.

Periodically inverted crystallographic domains provide simple but effective quasi-phase-matching. However, the grating can be composed of different non-inverted crystallographic orientations, for example |1,0,0| and |1,1,1|, since wafer bonding can fuse the disparate orientations. Quasi-phase-matching does not require equal and opposite non-linearities but only a non-linearity modulated with a nominal period of twice the coherence length.

The invention thus provides a straightforward method of forming a quasi-phase-matched waveguide for non-linear optical conversion, which offers great advantages for wavelength conversion in the infrared and for coherent sources of short-wavelength radiation. The method mostly requires standard semiconductor fabrication processes but nonetheless provides an effective semiconductor optical wavelength converter.

What is claimed is:

1. An integral optical circuit formed in a single substrate, comprising:
   a first waveguide formed in said substrate and having an active layer that emits radiation at a first frequency; and
   a second waveguide formed in said substrate and integrated with and coupled to said first waveguide and including an alternating structure of alternating crystallographic characteristics including an optically non-linear material and being operatively matched to said radiation of said first frequency.

2. The optical circuit of claim 1, wherein said alternating structure produces radiation of a second frequency equal to twice said first frequency.

3. The optical circuit of claim 2, wherein said second waveguide comprises at least one composition selected from the material family (Zn, Cd, Mg, Mn)(S, Se, Te).

4. The optical circuit of claim 3, wherein said first waveguide comprises AlGaAs and said second waveguide comprises ZnMgSSe.

5. The optical circuit of claim 1, further including:

a third waveguide capable of conveying radiation of a third frequency; and an optical coupler coupling said radiation from said first and third waveguides to said third waveguide;

whereby said second frequency is a function of said first and third frequencies.

6. The optical circuit of claim 1, wherein said alternating structure includes alternating regions of differing crystalline orientations.

7. The optical circuit of claim 1, wherein said differing crystalline orientations comprise inverted crystalline orientations.

8. The optical circuit of claim 1, wherein said alternating structure acts as one of a difference frequency generator, a frequency doubler, a parametric amplifier, or a parametric oscillator.

9. The optical circuit of claim 1, wherein said second waveguide produces a source of coherent radiation in a blue-green portion of the optical spectrum.

10. The integrated optical circuit of claim 1 wherein said active layer is electrically biased to emit said radiation of said first frequency.

11. The integrated optical circuit of claim 1, wherein said alternating structure comprises structures of differing material compositions.

* * * * *